(12) United States Patent
Jannott et al.

(10) Patent No.: US 8,706,646 B2
(45) Date of Patent: Apr. 22, 2014

(54) SYSTEM AND METHOD OF PRODUCING CONSTRUCTION SPECIFICATIONS

(75) Inventors: Frederick P. Jannott, Westport, CT (US); William Jannott, Newtown, CT (US)

(73) Assignee: Arcat, Inc., Fairfield, CT (US)

( * ) Notice: Subject to any disclaimer, the term of this patent is extended or adjusted under 35 U.S.C. 154(b) by 3469 days.

(21) Appl. No.: 10/960,834

(22) Filed: Oct. 7, 2004

(65) Prior Publication Data

US 2005/0044010 A1 Feb. 24, 2005

Related U.S. Application Data

(63) Continuation-in-part of application No. 10/448,857, filed on May 29, 2003.

(51) Int. Cl.
*G06Q 50/00* (2012.01)

(52) U.S. Cl.
USPC .......................................................... 705/313

(58) Field of Classification Search
USPC ....................................................... 705/1, 313
See application file for complete search history.

(56) References Cited

U.S. PATENT DOCUMENTS

| | | |
|---|---|---|
| 6,836,752 B2 | 12/2004 | Atasoy |
| 6,922,701 B1 | 7/2005 | Ananian |
| 7,006,977 B1 | 2/2006 | Attra et al. |
| 7,019,759 B1 | 3/2006 | Moore et al. |
| 7,162,688 B1 | 1/2007 | Gillig |
| 2001/0032062 A1 | 10/2001 | Plaskoff et al. |
| 2002/0010522 A1 | 1/2002 | Martin |
| 2002/0032546 A1 | 3/2002 | Imamura et al. |
| 2003/0078859 A1 | 4/2003 | Coke, II et al. |
| 2003/0208342 A1* | 11/2003 | Jung ................................. 703/1 |
| 2004/0111334 A1 | 6/2004 | Parsons |

* cited by examiner

*Primary Examiner* — Jami A Plucinski
*Assistant Examiner* — Vern Cumarasegaran
(74) *Attorney, Agent, or Firm* — Buckley, Maschoff & Talwalkar LLC

(57) ABSTRACT

A system for producing a configured construction specification for a construction product includes a website and an unconfigured specification accessible by the website, the unconfigured specification including a plurality of portions of construction specification information relating to the at least one construction product, each of the plurality of portions corresponding to at least one of a plurality of characteristics that define the at least one construction product. A webpage is displayed on the website, the webpage containing a plurality of indicia selectable by a user via the website, each of the plurality of indicia corresponding to at least one of the plurality of characteristics. Software executing on the website prepares a configured specification based at least in part upon the construction specification information contained in the unconfigured specification and the indicia selected by the user via the webpage.

34 Claims, 14 Drawing Sheets division [05] Metals:

[ 05400 ] Cold Formed Steel Framing (NUCONSTEEL™, A NUCOR Company)  [ Launch SpecWizard ]  or Download: [ms-word] [rtf] [word-perfect] [ascii] [lic.-agreement] [email mfgr.] [mfgr. profile]

36 —

[ 05511 ] Fixed Metal Ladders (ALACO Ladder Co.)  [ Launch SpecWizard ]  or Download: [ms-word] [rtf] [word-perfect] [ascii] [lic.-agreement] [email mfgr.] [mfgr. profile]

[ 05515 ] Aluminum Ladders (ACL Industries, Inc.)  [ Launch SpecWizard ]  or Download: [ms-word] [rtf] [word-perfect] [ascii] [lic.-agreement] [email mfgr.] [mfgr. profile]

[ 05515 ] Exit Ladder Devices (Jomy Products, Inc.)  [ Launch SpecWizard ]  or Download: [ms-word] [rtf] [word-perfect] [ascii] [lic.-agreement] [email mfgr.] [mfgr. profile]

[ 05725 ] Ornamental Metal Castings (Lawler Foundry Corp.)  [ Launch SpecWizard ]  or Download: [ms-word] [rtf] [word-perfect] [ascii] [lic.-agreement] [email mfgr.] [mfgr. profile]

[ 05800 ] Expansion Joints (Michael Rizza Co. Inc.)  [ Launch SpecWizard ]  or Download: [ms-word] [rtf] [word-perfect] [ascii] [lic.-agreement] [email mfgr.] [mfgr. profile]

division [06] Wood & Plastics:

[ 06471 ] Wood Shutters and Closet Doors (Kestrel Shutters)  [ Launch SpecWizard ]  or Download: [ms-word] [rtf] [word-perfect] [ascii] [lic.-agreement] [email mfgr.] [mfgr. profile]

Figure 4

SECTION 05511

FIXED METAL LADDERS

For best results, display hidden notes to specifier.

NOTE TO SPECIFIER  Alaco Ladder Company; fixed and folding aluminum wall ladders and ship's ladders.

This section is based on the products of Alaco Ladder Company, which is located at:
5167 G Street
Chino, CA 91710-5143
Tel: 888-310-7040
Fax: 909-591-7565
Email: sales@alacoladder.com
www.alacoladder.com Alaco is a manufacturer of special purpose and custom designed ladders to fit a variety of residential, commercial, and industrial uses. Established over 100 years ago, Alaco engineers and manufactures a wide array of ladders for numerous applications. Ladders are Alaco's only business, and they are the experts in the field.

SECTION 05511 - FIXED METAL LADDERS, Copyright 2003, ARCAT, Inc.

PART 1 GENERAL 1.1 SECTION INCLUDES
 NOTE TO SPECIFIER  Delete items below not required for project.

A. Fixed aluminum wall ladders.

B. Fixed aluminum ship's ladders.

C. Folding aluminum wall ladders.

D. Retractable aluminum wall ladders.

E. Fasteners and installation accessories.

1.2 RELATED SECTIONS
 NOTE TO SPECIFIER  Delete any sections below not relevant to this project; add others as required.

A. Section 05500 - Metal Fabrications: Catwalks and fire escapes.

B. Section 06100 - Rough Carpentry: Blocking in metal wall studs and partitions for anchorage of access ladders.

C. Section 06435 - Rolling Library Ladders.

Figure 5A 1.3 REFERENCES
\*\* NOTE TO SPECIFIER \*\* Delete references from the list below that are not actually required by the text of the edited section.

- A. ANSI A14.3 - American National Standard for Ladders -- Fixed -- Safety Requirements; 1992.
- B. ASTM B 209 - Standard Specification for Aluminum and Aluminum-Alloy Sheet and Plate; 2001.
- C. ASTM B 209M - Standard Specification for Aluminum and Aluminum-Alloy Sheet and Plate (Metric); 2001.
- D. ASTM B 210 - Standard Specification for Aluminum and Aluminum-Alloy Drawn Seamless Tubes; 2002.
- E. ASTM B 221 - Standard Specification for Aluminum and Aluminum-Alloy Extruded Bars, Rods, Wire, Profiles, and Tubes; 2000.
- F. ASTM B 221M - Standard Specification for Aluminum and Aluminum-Alloy Extruded Bars, Rods, Wire, Profiles, and Tubes (Metric); 2000.
- G. ASTM B 308 - Standard Specification for Aluminum-Alloy T6061-T6 Standard Structural; 2002.
- H. ASTM B 308M - Standard Specification for Aluminum-Alloy T6061-T6 Standard Structural; 2002.
- I. OSHA Regulations - 29 CFR 1910.27 - Fixed ladders; Occupational Safety and Health Standards; current edition.

1.4 SUBMITTALS

- A. Submit under provisions of Section 01300.
- B. Product Data: Manufacturer's data sheets on each product to be used, including:
  1. Preparation instructions and recommendations.
  2. Storage and handling requirements and recommendations.
  3. Installation methods.
- C. Shop Drawings: Detailed drawings showing complete dimensions, mounting attachments, and fabrication details.

1.5 QUALITY ASSURANCE

- A. Manufacturer Qualifications: Company specializing in the engineering and manufacturing of metal ladders, with not less than fifty years of experience.

1.6 WARRANTY

- A. See Section 01780 - Closeout Submittals, for additional warranty requirements.
- B. Provide manufacturer's standard limited five-year warranty against defects in materials and workmanship.

Figure 5B

PART 2 PRODUCTS 2.1 MANUFACTURERS

A. Acceptable Manufacturer: Alaco Ladder Company, 5167 G Street, Chino, CA 91710-5143. ASD. Tel: 888-310-7040. Fax: 909-591-7565. Email: sales@alacoladder.com. www.alacoladder.com.

NOTE TO SPECIFIER  Delete one of the following two paragraphs; coordinate with requirements of Division 1 section on product options and substitutions.

B. Substitutions: Not permitted.

C. Requests for substitutions will be considered in accordance with provisions of Section 01600.

2.2 MATERIALS

A. Extruded Aluminum Profiles: ASTM B 221/B 221M, ASTM B 210, ASTM B 308/B 308M; Alloy 6061-T6; standard mill finish.

B. Aluminum Sheet and Plate: ASTM B 209/B 209M, Alloy 6061-T6; standard mill finish.

C. Fasteners: Solid aluminum aircraft rivets rated at 300 lbs (1335 N) shear strength.

D. Fittings, Connectors, and Rung Ends: Cast aluminum alloy 356.

2.3 LADDERS

A. Ladders - General: Comply with ANSI A14.3 and OSHA regulations.

B. Vertical Fixed Aluminum Wall Ladders: 20-1/4 inches (514 mm) wide; extruded aluminum serrated rungs 1-1/8 inches (29 mm) in diameter, connected to 2-7/8 inch (73 mm) aluminum side rail channels with cast aluminum rung connectors, each secured to rails by means of four solid aircraft rivets; mounting brackets 3/8 inch (10 mm) thick at maximum spacing of 72 inches (1828 mm) center to center.

NOTE TO SPECIFIER  Delete the following paragraph if not required.

1. Walk-Through and Parapet Railings: Aluminum extrusions extend not less than 42 inches (1,067 mm) above landing; 24 inches (610 mm) between side rails at step through.

NOTE TO SPECIFIER  The following paragraph is for ladders over 20 feet in height. Delete if not required.

2. Cage: Aluminum bar hoops 1/4 by 2 inches (6 by 51 mm) and seven aluminum vertical bars 3/16 by 1-1/2 inches (5 by 38 mm) riveted rigidly together; spacing of hoops not to exceed 48 inches (1219 mm) center to center.

NOTE TO SPECIFIER  The following paragraph is for ladders over 30 feet in height; platforms are required at 30 ft intervals. Delete if not required.

3. Rest Platforms: Aluminum Grip Strut grating and aluminum toe boards 0.063 in (1.6 mm) thick by 4 inches (102 mm) wide; railings of 1-1/4 inch (32 mm) round serrated tube with cast aluminum railing fittings.

NOTE TO SPECIFIER  The following paragraph is for roof access ladders in locations that are accessible by the public. Delete if not required.

4. Security Doors: Form from aluminum sheet 0.188 inch (4.8 mm) in thickness; secure with stainless steel piano hinges and hasps.

NOTE TO SPECIFIER  The following paragraph is for roof hatch access ladders. Delete if not required.

Figure 5C

5. Hatch Access: Provide ladder side rail with rubber end caps and end with sufficient clearance for hatch to properly close.

C. Ship's Ladders: 24 inches (610 mm) wide.
 NOTE TO SPECIFIER  Delete one of the following two capacity paragraphs.
    1. Capacity: 500 lbs (225 kg).
 NOTE TO SPECIFIER  Delete two of the following three paragraphs.
        a. Slope: 60 degrees; 6-inch (152 mm) wide aluminum steps mounted on 10-13/32 inches (264 mm) centers to 5-1/4 inch (133 mm) aluminum side rails.
        b. Slope: 70 degrees.
 NOTE TO SPECIFIER  Delete one of the following two paragraphs.
           1) For Ladders Less Than 10 Feet: 3-inch (76 mm) wide aluminum steps mounted on 12 inch (305 mm) centers to 2-7/8 inch (73 mm) aluminum side rails.
           2) For Ladders 10 feet and Greater: 4-inch (102 mm) wide aluminum steps mounted on 12 inch (305 mm) centers to 4-1/8 inch (105 mm) aluminum side rails.
        c. Slope: 80 degrees; 3-inch (76 mm) wide aluminum steps mounted on 12 inch (305 mm) centers to 2-7/8 inch (73 mm) aluminum side rails.
    2. Capacity: 1000 lbs (450 kg).
 NOTE TO SPECIFIER  Delete three of the following four paragraphs.
        a. Slope: 60 degrees; 6-inch (152 mm) wide aluminum steps mounted on 12 inch (264 mm) centers to 5-5/8 inch (133 mm) aluminum side rails.
        b. Slope: 65 degrees; 6-inch (152 mm) wide aluminum steps mounted on 12 inch (264 mm) centers to 5-5/8 inch (133 mm) aluminum side rails.
        c. Slope: 70 degrees; 6-inch (152 mm) wide aluminum steps mounted on 12 inch (264 mm) centers to 5-5/8 inch (133 mm) aluminum side rails.
        d. Slope: 75 degrees; 6-inch (152 mm) wide aluminum steps mounted on 12 inch (264 mm) centers to 5-5/8 inch (133 mm) aluminum side rails.
    3. Fasten each step with not less than eight aluminum aircraft rivets.
    4. Provide handrails of 1-1/4 in (32 mm) round serrated aluminum tubing with cast or extruded aluminum fittings.
    5. Furnish ladder with four mounting brackets.

D. Folding Wall Ladders: 24 inches (610 mm) wide.
    1. Capacity: 500 lbs (225 kg).
 NOTE TO SPECIFIER  Delete three of the following four paragraphs.
    2. Slope: 60 degrees; 6-inch (152 mm) wide aluminum steps mounted on 10-13/32 inches (264 mm) centers to 5-1/4 inch (133 mm) aluminum side rails.
    3. Slope for Ladders Less Than 10 Feet: 70 degrees; 3-inch (76 mm) wide aluminum steps mounted on 12 inch (305 mm) centers to 2-7/8 inch (73 mm) aluminum side rails.
    4. Slope for Ladders 10 feet and Greater: 70 degrees; 4-inch (102 mm) wide aluminum steps mounted on 12 inch (305 mm) centers to 4-1/8 inch (105 mm) aluminum side rails.
    5. Slope: 80 degrees; 3-inch (76 mm) wide aluminum steps mounted on 12 inch (305 mm) centers to 2-7/8 inch (73 mm) aluminum side rails.
 NOTE TO SPECIFIER  Handrails are optional for folding ladders; delete the following paragraph if not required.
    6. Provide handrails of 1-1/4 in (32 mm) round serrated aluminum tubing with cast or extruded aluminum fittings and mounting brackets.
    7. Fasten each step with not less than eight aluminum aircraft rivets.
    8. Furnish with mounting bracket-slide assemblies to allow flat storage against wall and non-marking solid rubber feet for secure installation.

E. Retractable Aluminum Wall Ladders:

Figure 5D

1. Extruded aluminum.
2. Serrated rungs 1-1/8 inches (29 mm) in diameter, connected to 2-7/8 inch (73 mm) aluminum side rail channels with cast aluminum rung connectors, each secured to rails by means of four solid aircraft rivets.
3. Furnish with retractable mounting bracket assemblies for flat storage against the wall, non-marking solid rubber feet, and rubber plugs to provide closed end protection at top of side rails.

2.4 FINISHES

\*\* NOTE TO SPECIFIER \*\* Mill finish aluminum is standard. Custom coatings and surface treatments are available by special order.

A. Provide all aluminum in standard mill finish.

B. Factory finish all aluminum surfaces with manufacturer's standard powder coating system.

PART 3 EXECUTION 3.1 EXAMINATION

A. Do not begin installation until substrates have been properly prepared.

B. If substrate preparation is the responsibility of another installer, notify Architect of unsatisfactory preparation before proceeding.

3.2 INSTALLATION

A. Install in accordance with manufacturer's instructions and approved shop drawings, and in compliance with ANSI A14.3 and OSHA regulations.

3.3 PROTECTION

A. Protect installed products until completion of project.

B. Touch-up, repair or replace damaged products before Substantial Completion

END OF SECTION

Figure 5E

Alaco Ladders
05511 - FIXED METAL LADDERS
SpecWizard

Help

1. Select and Configure Aluminum Ladders:

[more info] ☐ Fixed Wall Ladders: —— 40

Choose 1 or more of the following:
   - ☐ Walk - through and parapet railings
   - ☐ Cage - for ladders over 20 feet high
   - ☐ Rest platforms at 30 feet intervals - for ladders over 30 feet high
   - ☐ Security doors - for roof access
   - ☐ Hatch Access - for roof hatch access

[more info] ☑ Ships Ladders - 24 inches (610 mm) wide: —— 42

Choose 1 of the following capacities:
   - ☐ Capacity: 500 lbs (225 kg): Slope: SELECT SLOPE
   - 48 —— ☑ Capacity: 1000 lbs (450 kg): Slope: 60 degrees —— 50

[more info] ☐ Folding Wall Ladders - 24 inches (610 mm) wide: —— 44

Capacity: 500 lbs (225 kg): Slope: SELECT SLOPE ——56

55 — ☐ Provide handrails of 1-1/4 in (32 mm) round serrated aluminum tubing;

[more info] ☐ Retractable Wall Ladders —— 46

[more info] ☐ Finishes SELECT FINISHES

2. When you are finished making selections: —— 54

[more info] SpecWizard Specification: 🔍 Preview ; or 🖨 Print Friendly (Full Screen)

[more info] Export SpecWizard Specification to: 📄 Word ; 📄 WP ; 📄 RTF ; 📄 Text ; or 📄 html .

SECTION 05511

FIXED METAL LADDERS

For best results, display hidden notes to specifier.

PART 1 GENERAL ~ 58

1.1 SECTION INCLUDES

A.   Fixed aluminum ship's ladders.

1.2 RELATED SECTIONS ~ 60

A.   Section 05500 - Metal Fabrications: Catwalks and fire escapes.

B.   Section 06100 - Rough Carpentry: Blocking in metal wall studs and partitions for anchorage of access ladders C.   Section 06435 - Rolling Library Ladders.

1.3 REFERENCES ~ 62

A.   ANSI A14.3 - American National Standard for Ladders -- Fixed -- Safety Requirements; 1992.

B.   ASTM B 209 - Standard Specification for Aluminum and Aluminum-Alloy Sheet and Plate; 2001.

C.   ASTM B 209M - Standard Specification for Aluminum and Aluminum-Alloy Sheet and Plate (Metric); 2001.

D.   ASTM B 210 - Standard Specification for Aluminum and Aluminum-Alloy Drawn. Seamless Tubes; 2002.

E.   ASTM B 221 - Standard Specification for Aluminum and Aluminum-Alloy Extruded Bars, Rods, Wire, Profiles, and Tubes; 2000.

F.   ASTM B 221M - Standard Specification for Aluminum and Aluminum-Alloy Extruded Bars, Rods, Wire, Profiles, and Tubes (Metric); 2000.

Figure 7A

G. ASTM B 308 - Standard Specification for Aluminum - Alloy T6061-T6 Standard Structural; 2002

H. ASTM B 308M - Standard Specification for Aluminum - Alloy T6061-T6 Standard Structural; 2002

I. OSHA 29 CFR Standard 1910.27 - Fixed ladders; Occupational Safety and Health Standards; current edition 1.4 SUBMITTALS ~ 64

A. Submit under provisions of Section 01300.

B. Product Data: Manufacturer's data sheets on each product to be used, including:
 1. Preparation instructions and recommendations.
 2. Storage and handling requirements and recommendations.
 3. Installation methods.

C. Shop Drawings: Detailed drawings showing complete dimensions, all materials, mounting attachments, and fabrication details.

1.5 QUALITY ASSURANCE ~ 66

A. Manufacturer Qualifications: Company specializing in the engineering and manufacturing of metal ladders, with not less than fifty years of experience.

1.6 WARRANTY ~ 68

A. See Section 01780 - Closeout Submittals, for additional warranty requirements.

B. Provide manufacturer's standard limited five-year warranty against defects in materials and workmanship.

PART 2 PRODUCTS ~ 70

2.1 MANUFACTURERS ~ 72

A. Acceptable Manufacturer: Alaco Ladder Company, 5167 G Street, Chino, CA 91710-5143. ASD. Tel: 888-310-7040. Fax: 909-591-7565. Email: sales@alacoladder.com. www.alacoladder.com.

B. Requests for substitutions will be considered in accordance with provisions of Section 01600.

Figure 7B 2.2 MATERIALS ~74

A.    Extruded Aluminum Profiles: ASTM B 221/B 221M, ASTM B 210, ASTM B 308/B 308M, Alloy 6061-T6; standard mill finish.

B.    Aluminum Sheet and Plate: ASTM B 209/B 209M, Alloy 6061-T6; standard mill finish.

C.    Fasteners: Aluminum solid aircraft rivets rated at 300 lbs (1335 N) shear strength.

D.    Cast fittings, connectors and rung ends: Cast Aluminum alloy 356

2.3 LADDERS ~76

A.    Ship's Ladders: 24 inches (610 mm) wide.
        1.    Capacity: 1000 lbs (450 kg).
            a.    Slope: 60 degrees; 6-inch (152 mm) wide aluminum steps mounted on 12 inch (264 mm) centers to 5-5/8 inch (133 mm) aluminum side rails.
        2.    Fasten each step with not less than eight aluminum aircraft rivets.
        3.    Provide handrails of 1-1/4 in (32 mm) round serrated aluminum tubing with cast or extruded aluminum fittings.
        4.    Furnish ladder with four mounting brackets.

PART 3 EXECUTION ~78

3.1 EXAMINATION ~80

A.    Do not begin installation until substrates have been properly prepared.

B.    If substrate preparation is the responsibility of another installer, notify Architect of unsatisfactory preparation before proceeding.

3.2 INSTALLATION ~82

A.    Install in accordance with manufacturer's instructions and approved shop drawings, and in compliance with ANSI A14.3 and OSHA 1910.27.

3.3 PROTECTION ~84

A.    Protect installed products until completion of project.

B.    Touch-up, repair or replace damaged products before Substantial Completion.

END OF SECTION

Figure 7C

ALACO Ladder Co. - Fixed Metal Ladders

START HERE

The SpecWizard concept is simple as 1, 2, 3:
1. Select products on the right
   by checking check boxes
2. Configure the products
   by selecting options
3. Then Export, Preview, or Print
   your SpecWizard spec \*\* NOTE TO SPECIFIER \*\* Alaco Ladder Company; fixed and folding aluminum wall ladders and ship's ladders.

This section is based on the products of Alaco Ladder Company, which is located at:
5167 G Street
Chino, CA 91710-5143
Tel: 888-310-7040
Fax: 909-591-7565
Email: sales@alacoladder.com — 86
[ Additional Product Data and Info ] — 88

Alaco is a manufacturer of special purpose and custom designed ladders to fit a variety of residential, commercial, and industrial uses. Established over 100 years ago, Alaco engineers and manufactures a wide array of ladders for numerous applications. Ladders are Alaco's only business, and they are the experts in the field.

SECTION 05511 - FIXED METAL LADDERS, Copyright 2003, ARCAT, Inc.

[ Comments? ]
[ What would make SpecWizard better? ]

Figure 8

SYSTEM AND METHOD OF PRODUCING CONSTRUCTION SPECIFICATIONS

CROSS-REFERENCE TO RELATED APPLICATIONS

This application is a continuation-in-part of currently pending U.S. patent application Ser. No. 10/448,857, filed May 29, 2003.

FIELD OF THE INVENTION

The present invention relates to a system and method for producing and presenting construction specifications to a user with user input which is easier, faster and more accurate than known specification creation techniques. The present invention is also concerned with methods of promoting clients to a receptive audience by producing and presenting one or more construction specifications to a user with user input.

BACKGROUND OF THE INVENTION

Successful commercial construction of facilities, such as office buildings, residences, water systems and transportation facilities, is a complex interplay among engineers, architects, contractors, suppliers, manufacturers, and facility owners. Typically, all parties rely to a critical extent on at least two contract documents used in construction—plans and specifications. For simplicity "plans" and "specifications" will be used throughout and may express the singular as well as the plural.

Plans convey primarily technical details of the facility through architectural engineering drawings that depict the facility layout and through more detailed construction drawings that utilize symbols to explain construction features. However, because of their focus on the visual aspects, plans are limited in conveying descriptive information and to calling out features and items, i.e. "concrete," "4 inch diameter pipe," etc., without significant appended description.

Specifications convey further descriptive information by specifying processes, materials, and conditions for features. Some features such as columns, walls, and footings are normally built on-site. Other features such as doors, windows, railings, etc., may be produced off-site and shipped to the facility site. Contractors implement specifications for such items by either custom crafting them or seeking appropriate commercially available products from suppliers and manufacturers that match the specifications.

A few specifications that are essentially fungible have been standardized by industry trade groups. In contrast, items that are not fungible generally do not lend themselves to complete standardization. While a door, for example, comes in standard dimensions, i.e. single width or double width, that are easily represented on plans; the door also contains elements of style and taste. Is the door to be plain or paneled; painted or stained; made of oak or oak veneer; made of natural or artificial material? Is the locking mechanism to be brass, steel, or copper; keyed or unkeyed? Is there to be a doorknob, door handle, or slide? Each option is a decision that an architect and facility owner must carefully consider and specify in the contract documents.

In practice, it is rare that architects specify custom products because of vastly increased labor and production costs due to customization. Thus, architects consult manufacturers' and suppliers' catalogs to present appropriate products to their clients. Although a manufacturer may require drawings to make the requisite product, architects and engineers find it easiest to represent selected commercially available products using generic symbols in the plans and describe relevant processes, materials, and conditions more specifically in text form as specifications.

Towards that end, manufacturers and suppliers go to great lengths to make listings of their products known to professionals in the construction industry. Typically, manufacturers and suppliers print glossy photo-rich product catalogs complete with sample specifications. Further product dissemination occurs as trade groups and industry publishers prepare compilations of the product catalogs of many manufacturers and suppliers into periodically updated topical catalogs, i.e. one volume dedicated to windows and doors, another to piping, etc., that are available on a subscription basis.

While local practice varies, a typical specification for a fire-escape ladder in a larger specification document, often called a bid document, is illustrated in FIG. 1. Specifications commonly follow the Construction Specifications Institute three part description text formatting illustrated. Each "part" is subdivided into further topical sections which aggregate statements about the products. The relative location of this specification to other specifications is indicated by a section number, shown at label A. At label B, technical details of loading capacity, rise and tread, and safety requirements are provided. Since construction elements interrelate to other elements, for example at labels C, other sections are commonly referenced.

Architects and engineers often use the sample specifications provided in the catalogs to draft their own specifications for inclusion in the contract documents. However, as product lines and the number of available style options increase, the chance for errors in specifications compound, as the product may be available in certain styles only in combination with other styles. One method to reduce potential errors is to provide a template specification. The template includes one or more blanks. Instructions point users to specific areas of the catalog to complete the blanks. This method itself has several drawbacks. The main drawback is that specifications and the blank template are essentially collections of statements that relate to a product. To fill in a blank template specification an architect or engineer must "solve" the template much as one would solve a puzzle, one statement at a time. Afterwards, the completed specification must be painstakingly rechecked to fully evaluate that all statements are correctly related to the product and interrelated to other specifications. Doing so, the user has to solve the puzzle in a manner non-analogous to his or her thought process—whereas, architects think of a commercially available product as whole applications that they wish to add within the context of the facility design, they must rummage through all facets of the product specification in order to assure correctness.

Electronic availability of product catalogs from manufacturers and suppliers through web sites eases time and cost barriers inherent to publishing the same catalogs. However, to overcome the aforementioned drawback, each possible variant of a specification must be made a record in an exhaustive database and presented to a user electronically. A drawback to such a system is that a means to access each record must be made available. Including a link to the relevant specification next to the product and creating the specification in an active server page is one way to accomplish this. By contrast, an outline format listing of all products where a user drills down to the desired product is an inconvenient way to access a specification. In an outline, a product having multiple style options may be correctly placed within the outline in multiple locations according to each option. Even when a means is established to access the database, access is made to a complete specification thus requiring a database with an extensive duplication of the same specification.

What is desired, therefore, is a system and method for preparing and presenting a construction specification to a user upon user input which is easier, faster and more accurate than known construction specification preparation techniques.

It is also desired to provide a system and method for promoting clients to a receptive audience by preparing and presenting one or more construction specifications to a user upon user input.

SUMMARY OF THE INVENTION

Accordingly, it is an object of the present invention to provide a system and method for preparing and presenting a construction specification to a user upon user input which is easier, faster and more accurate than known construction specification preparation techniques.

Another object of the present invention is to provide a system and method for promoting clients to a receptive audience by preparing and presenting one or more construction specifications to a user upon user input.

These and other objects of the present invention are achieved in accordance with one embodiment of the present invention by provision of a system for producing a configured construction specification for a construction product, the system including a website and an unconfigured specification accessible by the website, the unconfigured specification including a plurality of portions of construction specification information relating to the at least one construction product, each of the plurality of portions corresponding to at least one of a plurality of characteristics that define the at least one construction product. A webpage is displayed on the website, the webpage containing a plurality of indicia selectable by a user via the website, each of the plurality of indicia corresponding to at least one of the plurality of characteristics. Software executing on the website prepares a configured specification based at least in part upon the construction specification information contained in the unconfigured specification and the indicia selected by the user via the webpage.

In some embodiments, the software prepares the configured specification by extracting from the unconfigured specification those of the plurality of portions which correspond to the indicia selected by the user. In some embodiments, the software prepares the configured specification by deleting from the unconfigured specification those of the plurality of portions which correspond to the indicia not selected by the user. In some embodiments, the configured specification is compliant with a construction specification standard. In certain of these embodiments, the construction specification standard comprises at least one industry standard.

In some embodiments, the plurality of portions of construction specification information comprise at least one of summary information, standards information, references information, contract information, delivery information, warranty information, manufacturer information, design information, product specification information, installation information, and maintenance information. In some embodiments, the software generates a report for the configured specification, which report is available for download by the user via the website. In certain of these embodiments, the report is in a format which comprises at least one industry standard. In certain of these embodiments, the report is in a Construction Specifications Institute three part format.

In some embodiments, the website is accessible through at least one of an intranet and a global communications network. In certain of these embodiments, the global communications network comprises the Internet. In some embodiments, the specification utilizes at least one of an HTML format, an XHTML format, an XML format, a DHTML format, a Java format, an SGML format, a Flash formal and a Perl format. In some embodiments, the construction product is used in at least one of the following industries: the construction industry, the restoration industry, the demolition industry, the renovation industry, the destruction industry, the remodeling industry, and the retrofitting industry.

In some embodiments, at least one of the plurality of characteristics comprises a user selectable link in communication with the website and the user selectable link connects the website to information about the at least one of the plurality of characteristics which comprises a user selectable link. In some embodiments, the configured specification further comprises at least one user selectable indicia in communication with the website and the user selectable indicia connects the website to information about at least one of a supplier, a manufacturer, a distributor, a wholesaler, a retailer, and a shipper for the construction product.

In accordance with another embodiment of the present invention, an apparatus for producing a configured construction specification for a construction product includes a computer, an unconfigured specification comprising information relating to the construction product, the unconfigured specification being accessible by the computer, a plurality of indicia selectable by a user via the computer, each of the plurality of indicia corresponding to one of a plurality of characteristics that define the construction product, and a plurality of portions of construction specification information accessible by the computer, each of the plurality of portions of construction specification information corresponding to one of the plurality of indicia. The computer inserts one or ones of the plurality of portions of construction specification information which correspond to one or ones of the plurality of indicia selected by the user into the specification to produce a configured specification.

In accordance with another embodiment of the present invention, a method for producing a configured construction specification for a construction product, includes the steps of: (i) accessing an unconfigured specification, the unconfigured specification comprising a plurality of portions of construction specification information relating to the at least one construction product, each of the plurality of portions corresponding to at least one of a plurality of characteristics that define the at least one construction product; (ii) displaying a webpage containing a plurality of indicia selectable by a user via a website, each of the plurality of indicia corresponding to at least one of the plurality of characteristics; (iii) receiving an indication of at least one of the indicia selected by the user; and (iv) preparing a configured specification based at least in part upon the construction specification information contained in the unconfigured specification and the indication of the at least one indicia selected by the user.

In some embodiments, the preparing step comprises the step of preparing the configured specification by extracting from the unconfigured specification those of the plurality of portions which correspond to the indicia selected by the user. In some embodiments, the preparing step comprises the step of preparing the configured specification by deleting from the unconfigured specification those of the plurality of portions which correspond to the indicia not selected by the user. In some embodiments, the configured specification is compliant with a construction specification standard. In certain of these embodiments, the construction specification standard comprises at least one industry standard. In some embodiments, the plurality of portions of construction specification information comprise at least one of summary information, standards information, references information, contract information, delivery information, warranty information, manufacturer information, design information, product specification information, installation information, and maintenance information.

In some embodiments, the method further comprises the step of generating a report for the configured specification and making the report available for download by the user. In certain of these embodiments, the report is in a format which comprises at least one industry standard. In certain of these embodiments, the report is in a Construction Specifications Institute three part format. In some embodiments, the webpage is accessible through at least one of an intranet and a global communications network. In certain of these embodiments, the global communications network comprises the Internet. In some embodiments, the specification utilizes at least one of an HTML format, an XHTML format, an XML format, a DHTML format, a Java format, an SGML format, a Flash format and a Perl format.

In some embodiments, the construction product is used in at least one of the following industries: the construction industry, the restoration industry, the demolition industry, the renovation industry, the destruction industry, the remodeling industry, and the retrofitting industry. In some embodiments, at least one of the plurality of characteristics comprises a user selectable link in communication with the website and the user selectable link connects the website to information about the at least one of the plurality of characteristics which comprises a user selectable link. In some embodiments, the configured specification further comprises at least one user selectable indicia in communication with the website and the user selectable indicia connects the website to information about at least one of a supplier, a manufacturer, a distributor, a wholesaler, a retailer, and a shipper for the construction product. In some embodiments, the method further includes the step of charging a fee for having the unconfigured specification available for configuration.

In accordance with another embodiment of the present invention, a method for promoting a construction product and increasing an incidence that the construction product is specified comprises the steps of: (i) collecting a fee from a party affiliated with an unconfigured specification in order to make the unconfigured specification available for configuration via said method; (ii) accessing the unconfigured specification, the unconfigured specification comprising a plurality of portions of construction specification information relating to the construction product, each of the plurality of portions corresponding to at least one of a plurality of characteristics that define the construction product; (iii) displaying a webpage containing a plurality of indicia selectable by a user via a website, each of the plurality of indicia corresponding to at least one of the plurality of characteristics; (iv) receiving an indication of at least one of the indicia selected by the user; and (v) preparing a configured specification based at least in part upon the construction specification information contained in the unconfigured specification and the indication of the at least one indicia selected by the user.

In some embodiments, the party affiliated with the unconfigured specification comprises at least one of a supplier, a manufacturer, a distributor, a wholesaler, a retailer, and a shipper for the construction product.

Other objects, features and advantages according to the present invention will become apparent from the following detailed description of certain advantageous embodiments when read in conjunction with the accompanying drawings in which the same components are identified by the same reference numerals.

BRIEF DESCRIPTION OF THE DRAWINGS

FIG. 4 is an exemplary listing of construction specifications as prepared and presented by the embodiment of the system shown in FIG. 2;

FIGS. 5A-5E illustrate an exemplary unconfigured specification of a particular construction product which is used by the embodiment of the system shown in FIG. 2 in order to prepare and present a configured construction specification;

FIG. 6 is an exemplary screenshot illustrating a page displayed by the embodiment of the system shown in FIG. 2 wherein a user is presented with a plurality of user selectable indicia from which to select in order to configure the construction product specification shown in FIGS. 5A-5E;

FIGS. 7A-7C illustrate an exemplary configured specification of a particular construction product prepared and presented by the embodiment of the system shown in FIG. 2; and FIG. 8 is an exemplary screenshot illustrating user selectable connections within a configured specification of a particular construction product as prepared and presented by the embodiment of the system shown in FIG. 2.

DETAILED DESCRIPTION OF THE DRAWINGS

Figure 1:
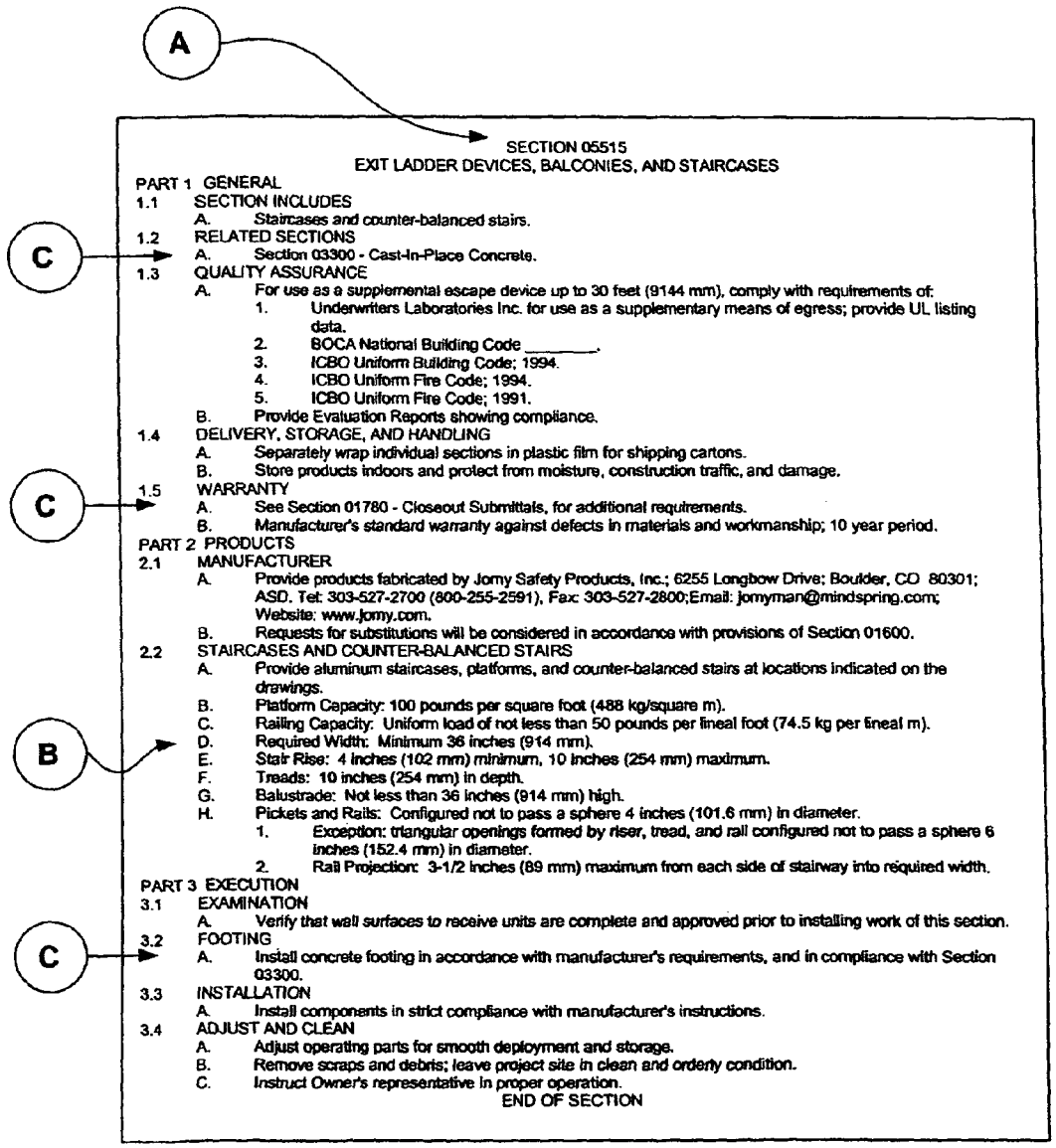
FIG. 1 is an illustration of a typical construction specification for a construction product.

System 10 is a system for preparing and presenting one or more configured specifications 12 for a construction product to a user 14 based upon one or more user selected indicia 16 enabled by website 18. Parts of system 10 can be formatted in Hypertext Markup Language, Extensible Hypertext Markup Language, Dynamic Hypertext Markup Language, Standard Generalized Markup Language, Extensible Markup Language, Java, Flash, Perl, and the like, or combinations of the preceding. The presentation and preparation of a configured specification 12 of a construction product advantageously promotes the construction product and its manufacturer and/or distributor, herein manufacturer for clarity.

The following co-pending patent application, filed on May 29, 2003, and assigned to the ARCAT, Inc., is incorporated by reference herein: U.S. patent application Ser. No. 10/448,857, entitled "System and Method of Presenting Construction Specifications".

Figure 2:
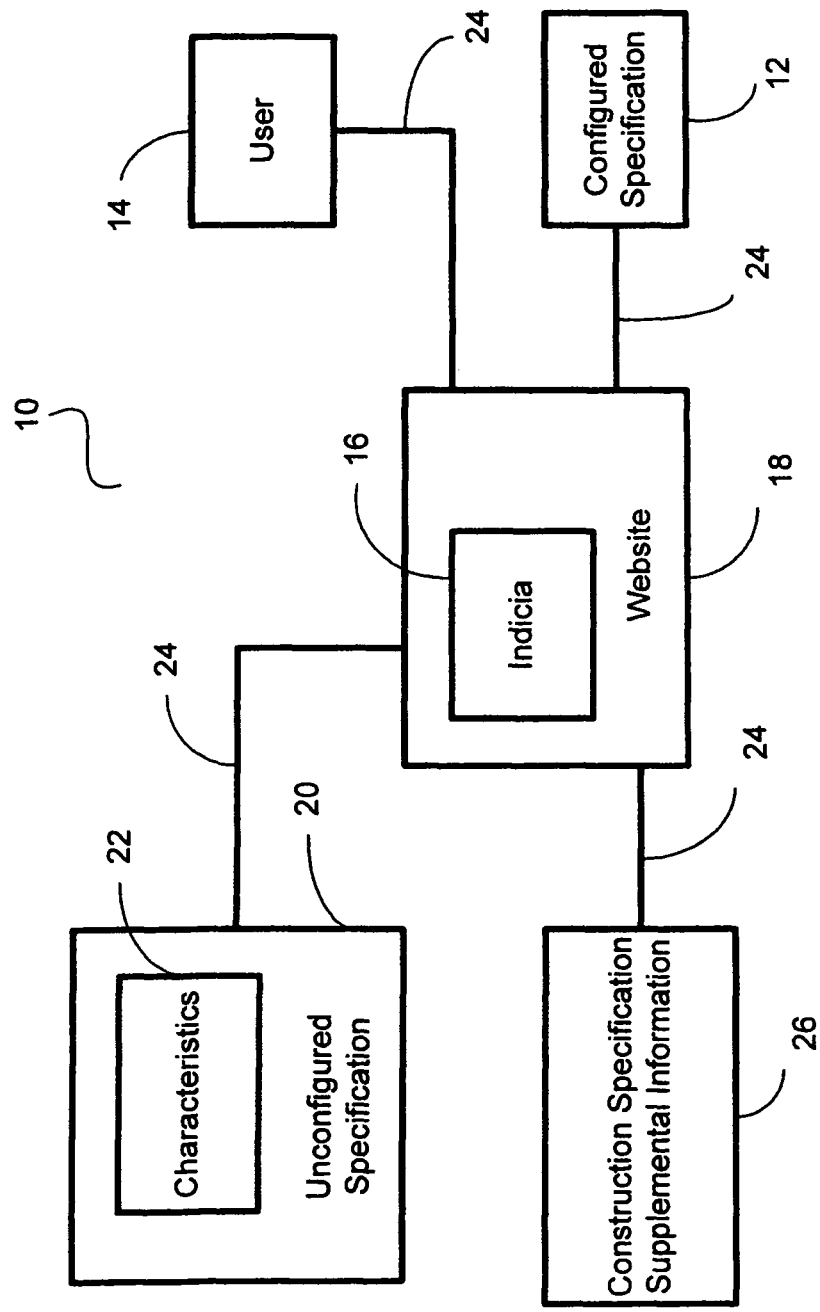
FIG. 2 is a block diagram of a system for preparing and presenting a construction specification in accordance with an embodiment of the present invention.

FIG. 2 is a block diagram of a system 10 for producing and presenting a configured specification 12 in accordance with one embodiment of the present invention. System 10 includes at least one unconfigured specification 20 with a plurality of characteristics 22 operatively in communication with website 18 via communications link 24. Unconfigured specification 20 is a file that is called up by user 14, and used by system 10 to produce configured specification 12. Unconfigured specification 20 may be displayed on website 18 in some embodiments if such is desired, or unconfigured specification 20 may simply be used by system 10 without being displayed. Unconfigured specification 20 provides information concerning a particular construction product that can be refined further by a user's selection of particular characteristics 22 through indicia 16 so as to arrive at configured specification 12 as described in more detail below.

Further, system 10 includes a plurality of construction specification supplemental information 26 that defines further relevant information about a chosen construction product that is defined by a selected unconfigured specification 20. Construction specification supplemental information is information not contained in unconfigured specification 20, but that may be useful to the user 14 in producing configured specification 12. Construction specification supplemental information 26 may comprise at least one of summary information, standards information, references information, contract information, delivery information, warranty information, manufacturer information, design information, product specification information, installation information, maintenance information, and optionally budget information and advertising. Construction specification supplemental information 26 can be any information deemed relevant to a particular construction product. In one example, construction specification supplemental information 26 may be accessed by a user activating a user selectable indicia 55 (see FIG. 6).

Figure 3:
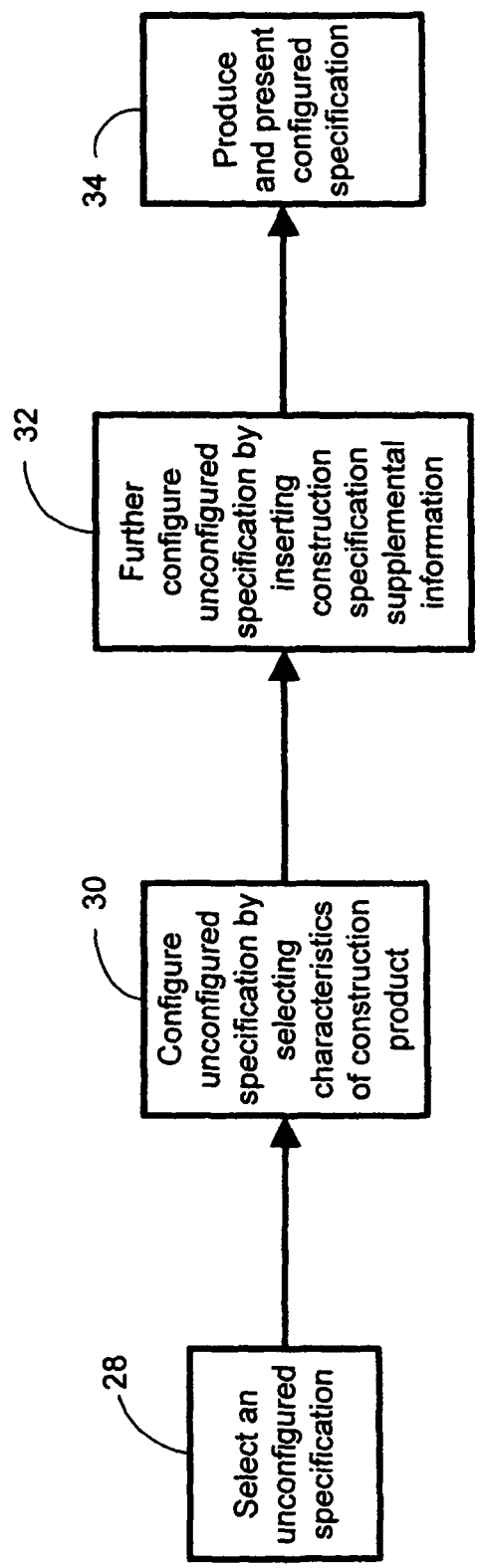
FIG. 3 is a flowchart illustrating in more detail operation of the embodiment of the system shown in FIG. 2.

FIG. 3 is a flowchart illustrating in more detail the operation of the embodiment of system 10 for producing and presenting a construction specification in accordance with invention of FIG. 2. At block 28, user 14 selects an unconfigured construction specification 20 in order to find out more information about a particular construction product. User 14 can then configure the selected unconfigured specification 20 by selecting particular characteristics 22 via indicia 16 on website 18 that further define the type of construction product that unconfigured specification 20 represents, at block 30.

Unconfigured specification 20 is then further configured by system 10 through the insertion of construction specification supplemental information 26 into unconfigured specification 20. System 10 can then produce and present to user 14 configured specification 12 of a construction product that can aid user 14 in the selection, purchase, installation, shipping, maintenance, and the like of the construction product represented by configured specification 12.

FIG. 4 is an exemplary screenshot listing of construction product specifications as generated by an embodiment of system 10 for generating a construction specification in accordance with invention of FIG. 2. From such a listing, user 14 can select a particular indicia that represents a particular construction product in which user 14 is interested. For example, user 14 can select fixed metal ladders 36 in order to have a construction specification produced and presented by system 10.

FIGS. 5A-5E illustrate an exemplary unconfigured specification 20 of a particular construction product which is used by system 20 in order to prepare and present a configured construction specification 12 to user 14. It should be noted that for the sake of simplicity, a relatively short and simple unconfigured specification 20 is illustrated. In practice, unconfigured specifications are often 20 to 50 pages with many more options from which the specifier is required to choose. As mentioned above, it is possible for the unconfigured specification 20 to be displayed to the user 14. However, for it is much more desirable for the user 14 to never even be required to view unconfigured specification 20, because such unconfigured specifications are generally confusing and substantially no pertinent information can be gleaned therefrom which cannot be found on the pages which are displayed to the user 14, as described below.

FIG. 6 is an exemplary screenshot illustrating a web page 38 displayed by system 10 wherein a user is presented with a plurality of user selectable indicia from which to select in order to configure the unconfigured construction product specification 20 shown in FIGS. 5A-5E. As will be noted, web page 38 contains substantially all of the choices presented to the specifier in unconfigured specification 20. However, the choices are in a much more user-friendly format which is far less confusing for the specifier.

More specifically, if the specifier were manually configuring unconfigured specification 20, the specifier would have to wade through each of the pages illustrated in FIGS. 5A-5E looking for pertinent information and desirable options, look for instructions to the specifier, and manually delete unnecessary items (if the specifier could even determine which items were unnecessary). For example, in the situation shown in FIGS. 5A-7C, the specifier, desiring to specify a ships ladder having a capacity of 1000 lbs. and a 60 degree slope would first have to locate the place where different types of ladders can be chosen from (in this case, section 1.1 on FIG. 5A), and delete the unselected items. Next, the specifier would have to wade through many other items looking for the section pertinent to the type of ladder chosen (in this case, section 2.3(C) on FIG. 5D), the particular desired capacity (in this case, section 2.3(C)(2)) and the particular desired slope (in this case, section 2.3(C)(2)(a)). The user would then have to manually delete the plethora of non-pertinent items from the specification, being careful to delete all non-pertinent items and not to delete any pertinent items. As can be appreciated, this can be a labor intensive process which is prone to errors.

In contrast, the same selections can be made on the web page 38 shown in FIG. 6 in a much more user-friendly manner. For example, user 14 has selected the same characteristics described above—a characteristic 22 of ships ladders 42 capacity 48 of 1000 lbs. and a slope of "60 degrees" 50—by simply checking two boxes and making one selection from a drop-down list on a web page which is short, well organized and does not contain a large amount of extraneous information. Characteristics 22 can be presented to user 14 via drop down menus having multiple options such as drop down menu 56, single check boxes such as capacity 48, or through other similar type selectable connections. Webpage 38 shown in FIG. 6 would be displayed as a result of the selection of fixed metal ladders 36 on the webpage shown in FIG. 4. Within this unconfigured specification 20, user 14 can further define what type of fixed metal ladders 36 he or she desired to specify by selecting characteristics 22 such as fixed wall ladders 40, ships ladders 42, folding wall ladders 44, retractable wall ladders 46, and the like.

When the selection of characteristics 22 is completed for a given unconfigured specification 20, user 14 can select to have system 10 generate a configured construction specification for the chosen construction product at instruction line 54. Following instruction line 54 is a number of indicia 16 that are user selectable connections which can generate the desired construction specification for the chosen specification 20 having certain characteristics 22 (i.e., be in certain formats 52).

For instance, user 14 can chooses an indicia 16 which causes system 10 to insert construction specification supplemental information 26 into specification 20 according to what construction product specification 20 and characteristics 22 were selected to produce a configured specification 12. Configured specification 12 is a construction specification for at least one construction product having certain characteristics 22 that were selected by user 14.

FIGS. 7A-7C show an example of a configured specification 12 as generated by system 10 based upon unconfigured specification 20 (shown in FIGS. 5A-5E) and the characteristics 22 selected by user 14 via user selectable indicia 16 on webpage 38 (shown in FIG. 6). Configured specification 12 may be in three part construction specifications institute format, although such is not strictly required. Part I (spanning FIGS. 7A and 7B) includes general information 58 which provides user 14 with relevant information for the construction product represented by configured specification 12. Relevant information such as cross references to related sections 60 of construction specifications and/or references 62 that can be useful to user 14 for understanding the requirements presented by the construction product of the configured specification 12. Part I also includes information such as submittals information 64, quality assurance information 66, and warranty information 68.

Part II (spanning FIGS. 7B and 7C) includes products details information 70 about the construction product represented by configured specification 12 and comprises manufacturer's information 72 that provides contact information for the manufacturer or manufacturers. In an alternative embodiment, the products details information 70 can provide information about distributors, wholesalers, shippers, installers, and the like. Part II also includes materials information 74 which provides relevant information about the materials of which the construction product is made of, and product information 76 which provides specific details that represent the choice of the selected construction product along with selected characteristics 22.

Part III (contained on FIG. 7C) includes execution information 78 which provides user 14 with instructions for the selected construction product. Examination information 80 details what is necessary prior to the installation of the construction product, installation information 82 details how the construction product is to be installed and protection information 84 details the care of the construction product up to completion of the project.

In an alternative embodiment, the information provided by FIGS. 7A-7C can be in the form of user selectable indicia thereby enabling user 14 a connection that provides more information about the construction product. For example, FIG. 8 provides email link 86 to the manufacture and/or product data link 88 that can retrieve more information about a selected construction product for user 14.

The present invention therefore provides a system and method for preparing and presenting a construction specification to a user upon user input which is easier, faster and more accurate than known construction specification preparation techniques.

Manufacturers of products have incentive to participate in the system and method of the present invention to increase the incidence of being specified, thus increasing sales. This is true because users 14 of system 10 are much more likely to specify a particular product of a particular manufacturer if the unconfigured specification of that product is available for configuration via system 10, as compared to similar products of other manufacturers. As such, manufacturers are willing to pay a fee to have the unconfigured specifications of their products available for configuration via system 10.

It is also desired to provide a system and method for promoting clients to a receptive audience by preparing and presenting one or more construction specifications to a user upon user input.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for producing a configured construction specification for a construction product, said system comprising:
   a website;
   an unconfigured specification accessible by said website, said unconfigured specification comprising a plurality of portions of construction specification information relating to said at least one construction product, each of the plurality of portions corresponding to at least one of a plurality of characteristics that define said at least one construction product;
   a webpage displayed on the website, said webpage containing a plurality of indicia selectable by a user via said website, each of said plurality of indicia corresponding to at least one of the plurality of characteristics; and
   software executing on said website for preparing a configured specification based at least in part upon the construction specification information contained in the unconfigured specification and the indicia selected by the user via said webpage.

2. The system of claim 1 wherein said software prepares the configured specification by extracting from the unconfigured specification those of said plurality of portions which correspond to the indicia selected by the user.

3. The system of claim 1 wherein said software prepares the configured specification by deleting from the unconfigured specification those of said plurality of portions which correspond to the indicia not selected by the user.

4. The system of claim 1 wherein said configured specification is compliant with a construction specification standard.

5. The system of claim 4 wherein said construction specification standard comprises at least one industry standard.

6. The system of claim 1 wherein said plurality of portions of construction specification information comprise at least one of summary information, standards information, references information, contract information, delivery information, warranty information, manufacturer information, design information, product specification information, installation information, and maintenance information.

7. The system of claim 1 wherein said software generates a report for said configured specification, which report is available for download by the user via said website.

8. The system of claim 7 wherein said report is in a format which comprises at least one industry standard.

9. The system of claim 8 wherein said report is in a Construction Specifications Institute three part format.

10. The system of claim 1 wherein said website is accessible through at least one of an intranet and a global communications network.

11. The system of claim 10 wherein said global communications network comprises the Internet.

12. The system of claim 1 wherein said specification utilizes at least one of an HTML format, an XHTML format, an XML format, a DHTML format, a Java format, an SGML format, a Flash formal and a Perl format.

13. The system of claim 1 wherein said construction product is used in at least one of the following industries: the construction industry, the restoration industry, the demolition industry, the renovation industry, the destruction industry, the remodeling industry, and the retrofitting industry.

14. The system of claim 1 wherein at least one of said plurality of characteristics comprises a user selectable link in communication with said website and said user selectable link connects said website to information about the at least one of said plurality of characteristics which comprises a user selectable link.

15. The system of claim 1 wherein said configured specification further comprises at least one user selectable indicia in communication with said website and said user selectable indicia connects said website to information about at least one of a supplier, a manufacturer, a distributor, a wholesaler, a retailer, and a shipper for said construction product.

16. An apparatus for producing a configured construction specification for a construction product, said apparatus comprising:
   a computer;
   an unconfigured specification comprising information relating to said construction product, said unconfigured specification being accessible by said computer;
   a plurality of indicia selectable by a user via said computer, each of said plurality of indicia corresponding to one of a plurality of characteristics that define said construction product;
   a plurality of portions of construction specification information accessible by said computer, each of said plurality of portions of construction specification information corresponding to one of said plurality of indicia; and
   wherein said computer inserts one or ones of said plurality of portions of construction specification information which correspond to one or ones of said plurality of indicia selected by the user into said specification to produce a configured specification.

17. A method for producing a configured construction specification for a construction product, said method comprising the steps of:
   accessing an unconfigured specification, the unconfigured specification comprising a plurality of portions of construction specification information relating to the at least one construction product, each of the plurality of portions corresponding to at least one of a plurality of characteristics that define the at least one construction product;
   displaying a webpage containing a plurality of indicia selectable by a user via a website, each of the plurality of indicia corresponding to at least one of the plurality of characteristics;
   receiving an indication of at least one of the indicia selected by the user; and
   preparing a configured specification based at least in part upon the construction specification information contained in the unconfigured specification and the indication of the at least one indicia selected by the user.

18. The method of claim 17 wherein said preparing step comprises the step of preparing the configured specification by extracting from the unconfigured specification those of the plurality of portions which correspond to the indicia selected by the user.

19. The method of claim 17 wherein said preparing step comprises the step of preparing the configured specification by deleting from the unconfigured specification those of the plurality of portions which correspond to the indicia not selected by the user.

20. The method of claim 17 wherein the configured specification is compliant with a construction specification standard.

21. The method of claim 20 wherein the construction specification standard comprises at least one industry standard.

22. The method of claim 17 wherein the plurality of portions of construction specification information comprise at least one of summary information, standards information, references information, contract information, delivery information, warranty information, manufacturer information, design information, product specification information, installation information, and maintenance information.

23. The method of claim 17 wherein further comprising the step of generating a report for the configured specification and making the report available for download by the user.

24. The method of claim 23 wherein the report is in a format which comprises at least one industry standard.

25. The method of claim 24 wherein the report is in a Construction Specifications Institute three part format.

26. The method of claim 17 wherein the webpage is accessible through at least one of an intranet and a global communications network.

27. The method of claim 26 wherein the global communications network comprises the Internet.

28. The method of claim 17 wherein the specification utilizes at least one of an HTML format, an XHTML format, an XML format, a DHTML format, a Java format, an SGML format, a Flash formal and a Perl format.

29. The method of claim 17 wherein the construction product is used in at least one of the following industries: the construction industry, the restoration industry, the demolition industry, the renovation industry, the destruction industry, the remodeling industry, and the retrofitting industry.

30. The method of claim 17 wherein at least one of the plurality of characteristics comprises a user selectable link in communication with the website and the user selectable link connects the website to information about the at least one of the plurality of characteristics which comprises a user selectable link.

31. The method of claim 17 wherein the configured specification further comprises at least one user selectable indicia in communication with the website and the user selectable indicia connects the website to information about at least one of a supplier, a manufacturer, a distributor, a wholesaler, a retailer, and a shipper for the construction product.

32. The method of claim 17 further comprising the step of charging a fee for having the unconfigured specification available for configuration.

33. A method for promoting a construction product and increasing an incidence that the construction product is specified, said method comprising the steps of:
   collecting a fee from a party affiliated with an unconfigured specification in order to make the unconfigured specification available for configuration via said method;
   accessing the unconfigured specification, the unconfigured specification comprising a plurality of portions of construction specification information relating to the construction product, each of the plurality of portions corresponding to at least one of a plurality of characteristics that define the construction product;
   displaying a webpage containing a plurality of indicia selectable by a user via a website, each of the plurality of indicia corresponding to at least one of the plurality of characteristics;
   receiving an indication of at least one of the indicia selected by the user; and
   preparing a configured specification based at least in part upon the construction specification information contained in the unconfigured specification and the indication of the at least one indicia selected by the user.

34. The method of claim 33 wherein the party affiliated with the unconfigured specification comprises at least one of a supplier, a manufacturer, a distributor, a wholesaler, a retailer, and a shipper for the construction product.

* * * * *